Dec. 2, 1952
A. KAHN
2,619,951
PORTABLE BARBECUE GRILL
Filed March 7, 1950
2 SHEETS—SHEET 1
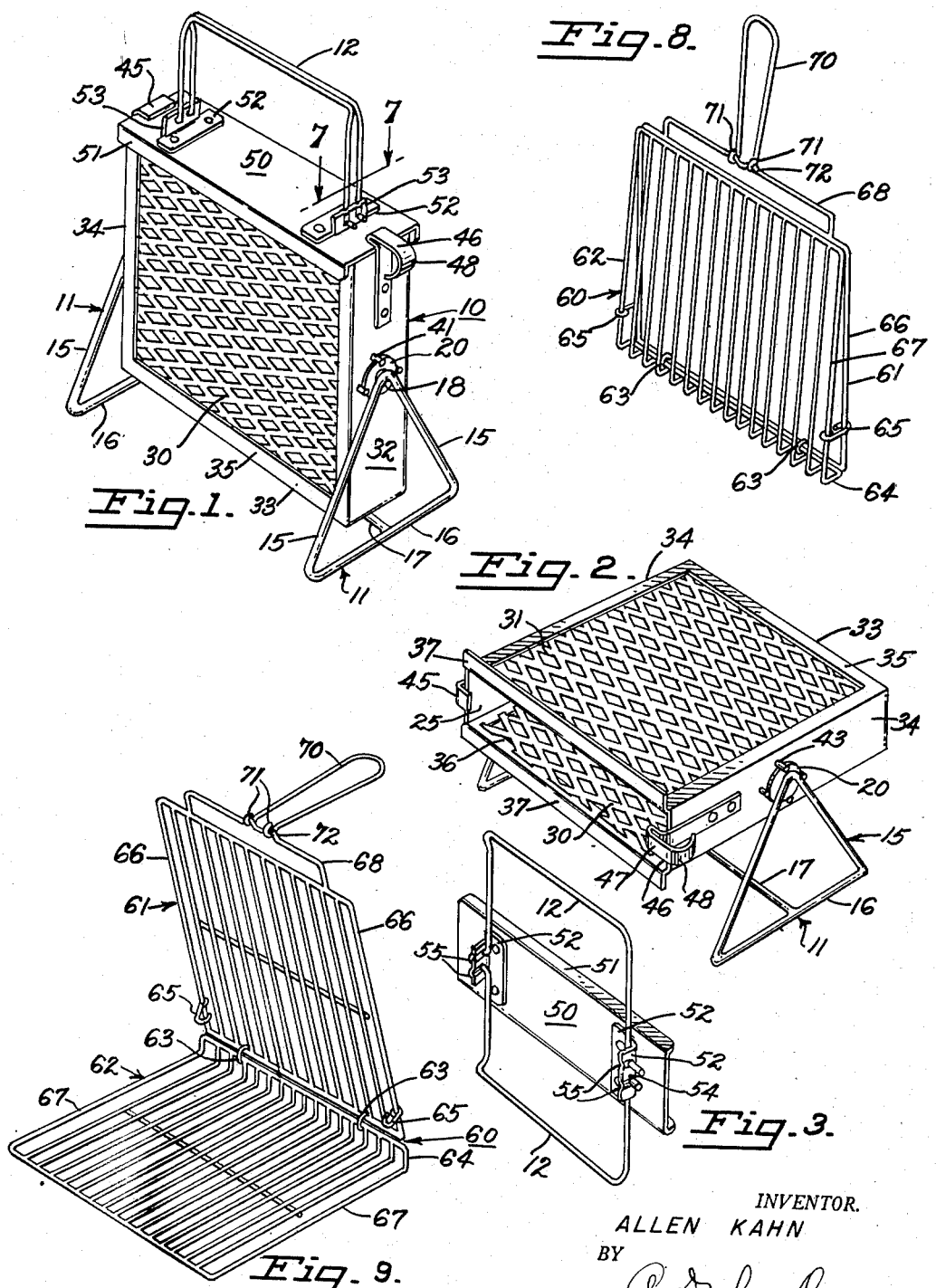
INVENTOR.
ALLEN KAHN
BY
ATTORNEY

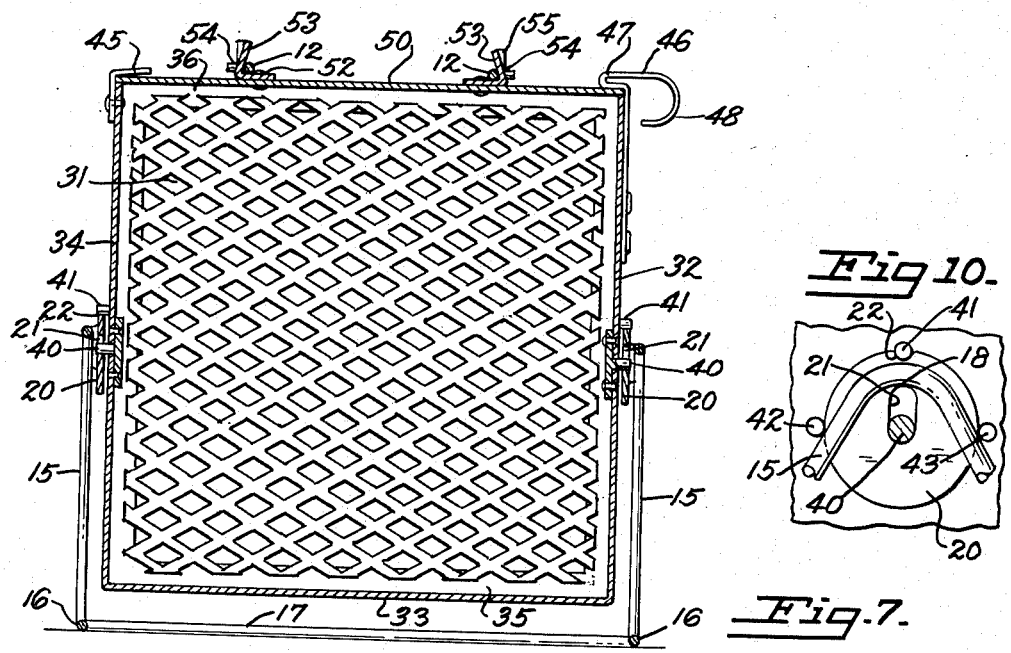
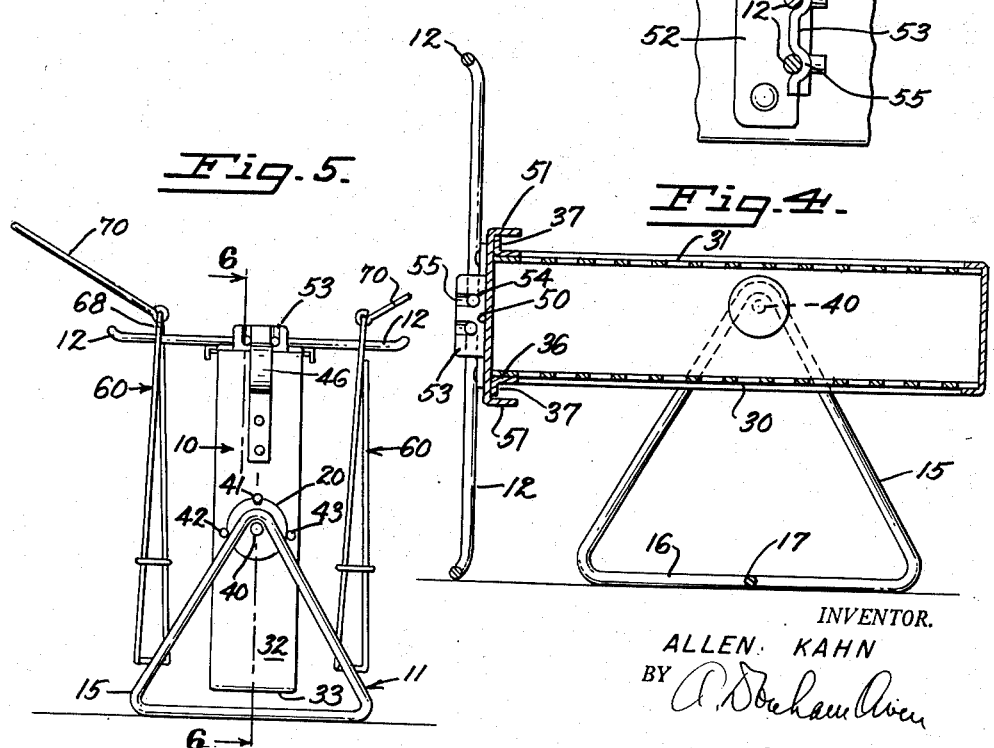

Patented Dec. 2, 1952

2,619,951

UNITED STATES PATENT OFFICE 2,619,951

PORTABLE BARBECUE GRILL

Allen Kahn, Belmont, Calif.

Application March 7, 1950, Serial No. 148,183

3 Claims. (Cl. 126—25)

This invention relates to an improved cooking apparatus. More specifically, it relates to a portable unit which may be used as a charcoal broiler.

Some objects of the invention are to provide a portable cooking unit that can be used as a charcoal broiler or barbecue; to provide a unit in which food may be cooked either directly over a fire or coals or at one side thereof and which can quickly be converted from one type of cooking to the other; and to provide an improved fire basket from which the charcoal or coals cannot escape. Other objects and advantages of the invention will appear from the following description.

The invention includes a fire basket that rests on a standard and has one or more carrying handles. The fire basket is so mounted on the standard that it can be shifted with ease between a horizontal position and a vertical one. When the fire basket is horizontal, food may be cooked on top of the basket, directly over the fire or coals. When the fire basket is vertical, the food may be cooked with radiant heat at either side of it. The handles are made so that they may be swung out beyond the sides. When the fire basket is vertical and the handles are out over the sides grill baskets may be suspended from the handles at any desired distance from the flame or coals. When the fire basket is in its horizontal position, one of the handles may also be used as an additional support or steady member for the fire basket.

A specific unit is illustrated in the drawings and will now be described in detail. However, I do not intend to limit the invention to the specific features described because they are illustrative and are given in compliance with U. S. Revised Statutes, section 4888. The scope of the invention is defined in the appended claims.

In the drawings:

Fig. 1 is a view in perspective of a cooking unit that embodies the principles of the invention, shown in its vertical carrying position;

Fig. 2 is a perspective view of the unit shown in its horizontal cooking position, but with the cover removed;

Fig. 3 is a view in perspective of the fire-basket cover, with the handles spread apart;

Fig. 4 is a view in end elevation and in section of the unit, shown in its horizontal cooking position and with the cover in place;

Fig. 5 is a view in end elevation of the unit, shown in its vertical cooking position, with the handles spread so as to support two grill baskets, one on each side of the fire basket;

Fig. 6 is a view in section taken along the line 6—6 in Fig. 5;

Fig. 7 is an enlarged view in section taken along the line 7—7 in Fig. 1 and showing one of the sockets in which the handles are mounted;

Fig. 8 is a view in perspective of a grill basket suitable for use with the invention; and Fig. 9 is a perspective view of the grill basket of Fig. 8, shown in its opened position.

Fig. 10 is an enlarged view of one of the locking discs and its associated pins.

The illustrated cooking unit includes a fire basket 10 that rests on a standard 11 and may be carried by a pair of handles 12.

The standards 11 include two triangular shaped legs 15 (see Figs. 1, 2, 4 and 5) which I prefer to make from metal rods bent into shape. The base 16 of each triangular shaped leg rests on the ground, and a rod 17 joins the two bases 16 together. Although the standard 11 is light in weight, it is very stable.

A disc 20 is secured adjacent to the apex 18 of each leg unit 15, and it has a central vertically elongated opening 21 through it which serves as a bearing for the pivot pin 40 in the end of the fire basket 10. Each disc 20 also has a notch 22 in its top edge which serves to lock the fire basket 10 in the desired position. (See Fig. 10.)

The fire basket 10 is preferably shaped like a box with one open side 25 where the fuel can be put in and which can then be closed by the cover 50 to lock the fuel in. (See Figs. 1, 2, 4, 5, and 6.) The two screen grills 30 and 31 comprise the parallel cooking surfaces of the box. The grills are metal screens and may be made of expanded metal, perforated metal plates, or any other suitable material. The other three sides 32, 33, and 34, their inturned flanges 35, and the rims 36 across the top of the open side 25 complete the box and support the screens 30 and 31. The rims 36 have outturned flanges 37 that help guide the cover 50 into place and hold it there.

The two support or pivot pins 40 are secured to the side or end walls 32 and 34 in about the center of these walls, preferably somewhat nearer the bottom of the basket 10 than its top (see Fig. 6). The pins 40 rotate freely in the bearing openings 21, and may slide along in the elongated slots which each of them provide.

The locking device which holds the fire basket 10 in position on the standards, comprises three lock pins 41, 42 and 43, each of which is adapted to fit in the notch 22, according to the position of the fire basket 10. When the basket 10 is vertical, the pin 41 engages the notch 22. When the basket is horizontal, the pin 42 or 43 is locked in the notch 22, depending which screen 30 or 31 is facing up. The pins can be unlocked from the notch 22 by lifting the basket since the pivot pins 40 fit loosely in the vertically elongated bearings 21; then the basket 10 can be swung around until the desired pin locks in the notch 22. (See Fig. 10.)

The flanges 37 help position the cover 50, and two locking member 45 and 46 hold the cover 50 in place. The member 45 is an L-shaped anchor strip secured to the side wall 32 (see Fig. 2). The member 46 is a spring clip held by the side wall 34; the member 46 is turned in like the anchor strip 45, but is bent back at 47 to provide a handle 48 for opening the box 10.

The cover 50 is a flat piece of metal with two side flanges 51 that fit over the flanges 37. One end of the cover 50 fits under the anchor strip 45, and the other end fits under the spring clip 46. When the cover 50 is being put on or taken off, the clip 46 is pulled back by pulling on its handle 48 and holding it out until the cover 50 is down. Then the clip 46 is released and it springs back into position, holding the cover 30 on tightly. (See Figs. 1 and 2.)

The handles 12 are mounted pivotally in brackets 52 secured to the cover 50. (See Fig. 3 and Fig. 6.) The brackets have inwardly sloping upstanding flanges 53 which are perforated at 54 to receive the handles 12. Each flange 53 has two vertical grooves 55 so that when the handles 12 are upright (Figs. 1 and 7), they will lock in the grooves. When they are swung out to the side (Figs. 3, 4 and 5), they are secured by the inwardly sloping angle of the flanges 53 (see Fig. 6). There is enough resiliency in the handles 12 to permit movement between these two positions.

Food may be cooked directly over the basket 10, using either screen 30 or 31 as a grill. (See Fig. 2 and Fig. 4.) However, many people prefer to radiant cook the food at one side of the fire basket 10. This can be done by arranging the basket 10 as shown in Fig. 5.

The basket 10 is vertical, and the two handles 12 are spread out and are secured there by the flange 53. Then the grill frames 60 may be suspended from the handles 12 at any desired distance from the fire basket 10.

Grill frames 60 suitable for use with the cooking unit are shown in Figs. 8 and 9. They include two gridirons 61 and 62, pivoted together at their lower end by a pair of rings 63. One gridiron 61 is flat; the other one 62 has an inturned portion 64 at its lower end which serves to space the gridirons apart at that end.

The gridirons are further secured together by a pair of releasable locking rings 65 which slide on each of the side rods 66 of one gridiron 61. When the two gridirons 60 and 61 are swung together with the meat inside (see Fig. 8), the locking rings 65 may be slid along the rods 66 to the upper end of the gridiron 61, slipped over the side rods 67 of the gridiron 62 and slid down both outer rods 66 and 67 until the grill frame 60 holds the meat tightly. In this way the grill frames 60 may be used to hold steaks of many different thicknesses.

The gridiron 61 also includes a wire bracket 68 adapted to fit over the handle 12 on the cooker. The bracket 68 can be slid along the handle 12 to any desired location, depending on how close to the fire the meat should be put.

The grill frame 60 also has its own handle 70. The lower ends 71 of the handle 70 are looped around the bracket 68, preferably in indentations or grooves 72 so that the handle 70 will be fixed in one place. The handle 70 can, however, be pivoted around the bracket 68 and thus kept away from the heat. (See Fig. 5.)

The cooking unit is light in weight and convenient to carry. As Fig. 1 shows, it is carried with the cover 50 on and with the handles 12 upright, locked in the grooves 55 in the flange 53.

To load the basket with fuel for cooking the cover 50 is first removed from the box 10 by pulling out on the spring clip handle 48 until the cover can be lifted off. After fuel has been put in the fire basket 10, the cover 50 may be replaced.

If the cooking is to be done with the basket upright the handles 52 may be swung out to the side, where they will be secured by the inturned flange 53. Then the grill frames 60 may be suspended from the handles 12 by their brackets 68, and the handles 70 swung out away from the flame.

If the cooking is to be done with the basket flat, it is lifted by the handles 12 to remove the lock pin 41 from the notch 22. The basket 10 is then swung in either direction until pin 42 or 43 falls into the notch 22. When the fire basket 10 is in the horizontal position, the lower handle 12 may be swung down to give additional support to the fire basket, but this is not usually necessary. The cooking can be done over either grill screen 30 or 31 or it may be started over one and shifted to the other if a different temperature is desired.

The cooking unit comprising this invention is safe to use and easy to carry about. Before setting out on a picnic, the fuel can be put in the basket and locked in by the cover 50. This avoids a messy job at the picnic spot and also means that no charcoal blocks will be spilled or lost on the way. When the fuel is being consumed it is inside the closed basket and cannot be spilled out or burn people or property if the basket should accidentally tumble from a table or support. Furthermore, with the fuel enclosed within the basket, and with the basket mounted as shown, the user can vary the type of cooking operation at any time without danger and can shift the basket to either of its three possible cooking positions. A poker or stick is enough to use to lift the basket, thereby lifting the locking pin out of the slot, and to shift the basket to the new position desired. At the end of the cooking operation, if all the fuel is not consumed, it can be extinguished without loss or delay and without the risk of starting a brush fire, simply by lowering the basket into water in a pool or other receptacle. By the time the next fire is to be made the fuel will probably have had time to dry out and it can be used.

While I have shown the handles 12 secured to the removable top 50, it is obvious that the handles could be secured as well to the opposite end 33 and then what is called here the top 50 would become a removable bottom. This reversal of elements would not change the advantages or the basic operation of the device.

Another change which might be made without sacrificing all the advantages of the device would be to omit the locking pins 42 and 43 and use one of the handles 12 to support the basket in either of its flat cooking positions. (See Fig. 4.)

I claim:

1. A portable cook unit, including in combination, a standard, a fire basket pivotally mounted on said standard, and cooperative locking means on said basket and said standard for holding said basket in either a vertical or horizontal position, said locking means comprising a plate on said standard having a vertically elongated central bearing and a peripheral notch at its upper end, and a pivot pin on each end of said basket which fits in said bearing, and locking pins on each end of said basket spaced from said pivot pin so that they can successively engage in said peripheral notch when said pivot pin is lowered in said bearing and can be disengaged therefrom when said pivot pin is raised in said bearing.

2. In a portable barbecue cooking unit, the combination of a fuel container comprising a basket having two rectangular perforated cooking surfaces on its opposite sides, secured together by two relatively narrow end members and a bottom member, and having a removable cover closing the open end thereof; a support for said fuel container comprising a frame having vertical end members, each with a bearing plate having a vertically elongated bearing near its upper end, and a notch in the periphery of said plate; a pivot means secured in the end members of said container, and locking pins spaced around said pivot means, one of which is engageable in said notch when said basket is in any of its operating positions.

3. The device of claim 2 in which handles are secured to said basket to swing on axis parallel to said pivot means.

ALLEN KAHN.

REFERENCES CITED

The following references are of record in the file of this patent:

UNITED STATES PATENTS

| Number | Name | Date |
|---|---|---|
| 2,048,769 | Anderson | July 28, 1936 |
| 2,379,239 | Krebs | June 26, 1945 |
| 2,501,104 | Smith | Mar. 21, 1950 |